(12) United States Patent
Wall

(10) Patent No.: US 10,589,627 B1
(45) Date of Patent: Mar. 17, 2020

(54) DISPLAY DEVICE

(71) Applicant: AUDI AG, Ingolstadt (DE)

(72) Inventor: Christian Wall, Hitzhofen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/461,307

(22) PCT Filed: Feb. 15, 2018

(86) PCT No.: PCT/EP2018/053760
§ 371 (c)(1),
(2) Date: May 15, 2019

(87) PCT Pub. No.: WO2018/153766
PCT Pub. Date: Aug. 30, 2018

(30) Foreign Application Priority Data

Feb. 27, 2017 (DE) .................. 10 2017 203 167

(51) Int. Cl.
*B60K 35/00* (2006.01)
*B60R 11/02* (2006.01)
(Continued)

(52) U.S. Cl.
CPC .......... *B60K 35/00* (2013.01); *B60R 11/0235* (2013.01); *G06F 3/1423* (2013.01);
(Continued)

(58) Field of Classification Search
CPC .. G06F 3/1423; G09G 3/36; G09G 2320/068; B60K 35/00; B60K 2370/1526;
(Continued)

(56) References Cited

U.S. PATENT DOCUMENTS 8,963,857 B2 * 2/2015 Kim ..................... G06F 3/0487
345/173
2006/0279528 A1 * 12/2006 Schobben ............. B60K 35/00
345/156
(Continued)

FOREIGN PATENT DOCUMENTS

DE 202004012734 U1 1/2006
DE 102012010679 A1 12/2013
(Continued)

OTHER PUBLICATIONS

English Translation by WIPO dated Sep. 6, 2019 of the International Preliminary Report on Patentability in corresponding International Patent Application No. PCT/EP2018/053760.
(Continued)

*Primary Examiner* — Ryan A Lubit
(74) *Attorney, Agent, or Firm* — Staas & Halsey LLP

(57) ABSTRACT

On an inner wall in the interior of a vehicle, a display device is subdivided into a plurality of display fields with two directly adjacent display fields connected to each other along a common axis. At least one display field can be pivoted relative to at least one bending plane to beam display content into the interior at an angle α relative to the at least one bending plane. In a first operating position, a surface of this at least one display field is oriented perpendicular to the at least one bending plane. In a second operating position, this at least one display field is pivoted relative to the at least one bending plane at an angle 90°-α relative to the at least one bending plane to beam the display content into the interior parallel to the at least one bending plane.

20 Claims, 2 Drawing Sheets

(51) Int. Cl.
*G06F 3/14* (2006.01)
*G09G 3/36* (2006.01)
*B60R 11/00* (2006.01)

(52) U.S. Cl.
CPC ........ *G09G 3/36* (2013.01); *B60K 2370/1526* (2019.05); *B60K 2370/1533* (2019.05); *B60K 2370/20* (2019.05); *B60R 2011/0005* (2013.01); *G09G 2320/068* (2013.01)

(58) Field of Classification Search
CPC ........ B60K 2370/1533; B60K 2370/20; B60R 11/0235; B60R 2011/0005
See application file for complete search history.

(56) References Cited

U.S. PATENT DOCUMENTS

| | | | | |
|---|---|---|---|---|
| 2007/0291172 | A1* | 12/2007 | Kouzimoto | B60R 11/02 348/488 |
| 2009/0161302 | A1* | 6/2009 | Ferren | B60K 35/00 361/679.01 |
| 2012/0235894 | A1* | 9/2012 | Phillips | G09G 3/36 345/156 |
| 2014/0292695 | A1* | 10/2014 | Wakamoto | G06F 3/1423 345/173 |
| 2014/0334075 | A1* | 11/2014 | Yamada | H05K 7/02 361/679.01 |
| 2017/0315352 | A1* | 11/2017 | Hardy | G02B 27/0101 |
| 2017/0322760 | A1* | 11/2017 | Soh | B60R 11/0235 |
| 2018/0176546 | A1* | 6/2018 | Lee | G02B 27/2235 |

FOREIGN PATENT DOCUMENTS

| | | |
|---|---|---|
| DE | 102013004395 A1 | 9/2014 |
| DE | 102017203167.0 | 2/2017 |
| EP | 1 947 636 A1 | 7/2008 |
| EP | 2 902 870 A2 | 8/2015 |
| JP | 2007-298838 | 11/2007 |
| WO | PCT/EP2018/053760 | 2/2018 |

OTHER PUBLICATIONS

German Office Action for German Application No. 10 2017 203 167.0 dated Feb. 14, 2018.
International Search Report for PCT/EP2018/053760 dated May 24, 2018.

* cited by examiner

DISPLAY DEVICE

CROSS REFERENCE TO RELATED APPLICATIONS

This application is the U.S. national stage of International Application No. PCT/EP2018/053760, filed Feb. 15, 2018, and claims the benefit thereof. The International Application claims the benefit of German Application No. 10 2017 203 167.0 filed on Feb. 27, 2017, both applications are incorporated by reference herein in their entirety.

BACKGROUND

Described below is a display device for an inner wall of an interior of a vehicle and to a method for presenting display content in an interior of a vehicle.

A display or a display panel usually has a defined emission angle. So-called dual-view displays, in which different images are visible from two different directions, are also known. However, it should be taken into account in this respect that these dual-view displays present a respective image or partial image only with half the resolution of the overall display on account of their properties.

A foldable display device is known from the document US 2012/0235894 A1. In this case, this display device includes two display panels which are connected to one another and can be positioned at an angle relative to one another along a common axis. During operation of this display system, partial displays of the display elements are combined in an angle-dependent manner to form a common display.

A display device and a method for operating the latter are described in the document EP 2 902 870 A2. This display device also includes two display elements which can be positioned at an angle relative to one another, wherein display content of these two displays is merged in an angle-dependent manner to form a common display content.

The document DE 20 2004 012 734 A1 furthermore shows a flat screen which is composed of pixels, wherein its image area is divided into at least two zones, wherein one zone is provided with an applied emission filter which emits in different directions for each pixel.

Against this background, the display device in a vehicle presents display content in the manner described below.

The display device can be arranged and/or is to be arranged on an inner wall in an interior of a vehicle and is subdivided into a plurality of display panels. In this case, two directly adjacent display panels are respectively connected to one another along a common axis, for example a bending axis, wherein these two directly adjacent display panels can be pivoted relative to one another about the common axis. The display device has at least one bending plane, wherein at least one display panel can also be pivoted relative to the at least one bending plane, wherein an angle $\alpha$ can be set and/or has been set for this at least one display panel which can be pivoted relative to the at least one bending plane, at which angle this at least one display panel which can be pivoted relative to the at least one bending plane emits display content into the interior, for example in the clockwise or anti-clockwise direction depending on the definition, relative to the at least one bending plane if a surface of this at least one display panel which can be pivoted relative to the at least one bending plane is oriented perpendicular to the at least one bending plane, for example, depending on the definition, in a first operating position. This at least one display panel which can be pivoted relative to the at least one bending plane is pivoted at an angle of $90°-\alpha$, in the clockwise or anticlockwise direction depending on the definition, relative to the at least one bending plane in a second operating position.

In this case, this at least one display panel which can be pivoted relative to the bending plane emits the display content into the interior parallel to the at least one bending plane in the second operating position. In one configuration, an axis, about which two directly adjacent display panels can be pivoted relative to one another, runs through the at least one bending plane, relative to which the at least one display panel can be pivoted and to which the display panel is assigned.

In the case of the display device, provision is made, for example, for its at least one bending plane to be able to be oriented and/or to have to be oriented at a respectively provided angle, generally perpendicular, with respect to a surface of the inner wall. If the display device has a plurality of pivotable display panels, they are assigned to the at least one bending plane. In this case, it is possible for each display panel to be assigned to its own bending plane. It is accordingly possible for at least one bending plane to be assigned to at least one pivotable display panel.

It is also possible for the angle $\alpha$ provided for the at least one display panel which can be pivoted relative to the at least one bending plane to be an acute angle and therefore greater than $-90°$ and less than $+90°$. In this case, depending on the definition, for example on the basis of the clockwise direction, it is possible for a respective angle $\alpha$ which is provided for a respective pivotable display panel to have a positive value or a negative value.

In one configuration, the display device has at least one pair of display panels which can both be pivoted relative to the at least one bending plane, that is to say only one bending plane or one bending plane each, and can be correlated and/or are correlated with one another. In this case, surfaces of both display panels are oriented perpendicular to the at least one bending plane in the first operating position, wherein the two display panels emit a respective display content at a respective angle $\alpha$ relative to the at least one bending plane and at an angle of $90°-\alpha$ relative to their own surface, wherein, depending on the definition, for example taking into account the clockwise direction, the angle $\alpha$ for a first of the two display panels has a positive or negative value and, depending on the definition, for example taking into account the clockwise direction, the angle for a second of the two display panels has a negative or positive value, wherein the two display panels emit the display contents in different directions which are oriented at twice the angle $\alpha$ or at an angle of $2\alpha$, with a positive or negative value depending on the definition, with respect to one another.

The surface of the first of the two display panels is pivoted at an angle of $90°-\alpha$, with a positive or negative value depending on the definition, relative to the at least one bending plane in the second operating position, wherein the surface of the second of the two display panels is pivoted at an angle of $90°-\alpha$, with a negative or positive value depending on the definition, relative to the at least one bending plane in the second operating position, wherein the two display panels emit the display contents parallel to one another in the second operating position.

In this respect, it is also possible for the at least one bending plane to be arranged between the two display panels of the at least one pair of display panels, wherein the two display panels emit the display content away from the at least one bending plane in each case in the first operating position.

Depending on a perspective, it is also possible for the first display panel to be arranged to the left or right of the at least one bending plane and for the second display panel to be accordingly arranged to the right or left of the at least one bending plane depending on the definition. In this case, the first display panel to the left or right of the at least one bending plane emits the display content to the left or right away from the at least one bending plane in the first operating position and the second display panel to the right or left of the at least one bending plane emits the display content to the right or left away from the at least one bending plane in the first operating position.

One configuration provides for the angle $\alpha$ for the at least one display panel to be usually permanently set for both operating positions. Accordingly, the angle $90°$-$\alpha$, at which the display content of a respective pivotable display panel is emitted, is permanently set for both operating positions and is constant. However, it is also possible for the angle $\alpha$ to also be able to be varied and to be able to be set depending on requirements. Therefore, a value which is suitable and/or desired for at least one user of the display device can be permanently set and stored for the angle $\alpha$.

It is additionally possible for the display device to have at least one further display panel which is arranged and/or fixed in a stationary manner relative to the at least one bending plane and can be fixed in a stationary manner relative to the inner wall, wherein a surface of this at least one fixed display panel is oriented perpendicular to the at least one bending plane, wherein this at least one fixed display panel emits the display content parallel to the at least one bending plane in both operating positions and therefore independently of a respective operating position of the at least one pivotable display panel. The display content of at least one pivotable display panel is oriented at the angle $\alpha$ relative to the display content of the at least one fixed display panel in the first operating position, whereas display contents of the at least one pivotable display panel and of the at least one fixed display panel are oriented parallel to one another in the second operating position.

It is therefore also possible for the display device to have at least one pair of display panels which can be pivoted relative to the at least one bending plane and can be correlated and/or are correlated with one another and at least one display panel which is fixed relative to the at least one bending plane, wherein the at least one display panel which is fixed relative to the at least one bending plane is generally arranged between the two display panels of the at least one pair which can be pivoted relative to the at least one bending plane.

In one configuration, the display device includes at least one holding device having two outer surfaces arranged parallel to one another, wherein a first of the two outer surfaces is connected to at least one of the display panels, wherein a second of the two outer surfaces can be fastened and/or is to be fastened to the inner wall.

The display device can usually be arranged and/or is to be arranged between two seats of the vehicle on an inner wall of the interior of the vehicle which is arranged at the front in a forward direction of travel of the vehicle, wherein the at least one display panel which can be pivoted relative to the at least one bending plane emits the display content in the direction of one of the two seats in the first operating position. If the display device has at least one pair of pivotable display panels which are correlated with one another, one display panel respectively emits a respective display content to the interior of the vehicle in the direction of one seat in each case.

SUMMARY

The method is provided for the purpose of presenting at least one display content in an interior of a vehicle using a display device which is arranged on an inner wall in an interior of a vehicle and is subdivided into a plurality of display panels, wherein two directly adjacent display panels are connected to one another along a common axis, for example a bending axis, wherein these two directly adjacent display panels can be pivoted relative to one another about the common axis. The display device has at least one bending plane, wherein at least one display panel is assigned to this at least one bending plane and can also be pivoted relative to the at least one bending plane, wherein an angle $\alpha$ is set for this at least one display panel which can be pivoted relative to the at least one bending plane, at which angle display content of this at least one display panel which can be pivoted relative to the at least one bending plane is emitted into the interior, in the clockwise or anti-clockwise direction depending on the definition, relative to the at least one bending plane if a surface of this at least one display panel which can be pivoted relative to the at least one bending plane is oriented perpendicular to the at least one bending plane in a first operating position. This at least one display panel which can be pivoted relative to the at least one bending plane is pivoted at an angle of $90°$-$\alpha$, in the clockwise or anti-clockwise direction depending on the definition, relative to the at least one bending plane in a second operating position, wherein the display content of this at least one display panel which can be pivoted relative to the bending plane is emitted parallel to the at least one bending plane in the second operating position. In both operating positions mentioned, the display content of the at least one pivotable display panel is respectively emitted at an angle of $90°$-$\alpha$ relative to the surface thereof.

Overall, the presented display device is flexible, wherein display content or display contents is/are emitted at different angles in the first operating position and is/are emitted into the interior of the vehicle at the same angle in the second operating position using the display panels or displays of the device.

In this case, the display device is subdivided into at least two display panels and therefore into two viewing areas. In this case, each display panel is assigned its own specific emission angle and therefore angle $\alpha$, for example by a special light control film, wherein this angle $\alpha$ is set taking into account the clockwise direction depending on the position of at least one pivotable display panel relative to the at least one bending plane. In this case, it is possible for this angle to have a positive or negative value depending on the definition and taking into account the clockwise direction. On account of flexibility of the display device, it is possible to bend a junction between two directly adjacent display panels or displays or viewing areas, for example using kinematics integrated in the common axis and/or the holding device, for example. It is therefore possible, inter alia, to manipulate the emission direction of the angle of a pivotable display panel. If an embodiment of the display device is used when carrying out an embodiment of the method, different possible ways of viewing the display content which can be presented therewith can be achieved depending on an orientation of a respective display panel.

It goes without saying that the features mentioned above and the features yet to be explained below can be used not only in the respectively stated combination but also in other combinations or along without departing from the scope of the present invention.

BRIEF DESCRIPTION OF THE DRAWINGS

These and other aspects and advantages will become more apparent and more readily appreciated from the following description of exemplary embodiments described in detail and schematically with reference to the drawings of which.

DETAILED DESCRIPTION OF THE PREFERRED EMBODIMENT

The figures are described in a connected and comprehensive manner and the same reference signs are assigned to identical components.

Figure 1A:
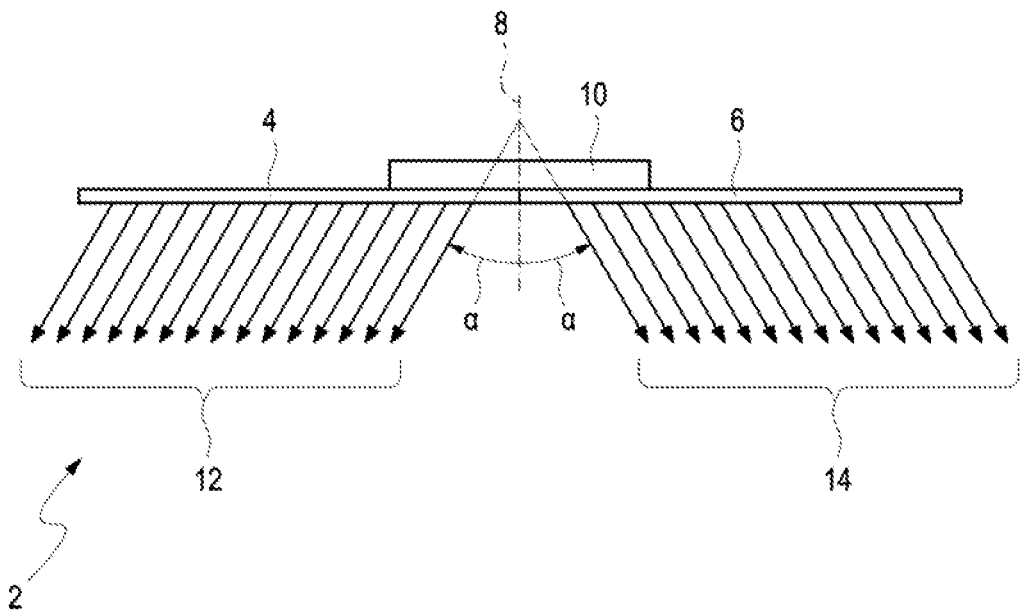
FIG. 1 is a schematic illustration of a first embodiment of the display device in different operating states which result when carrying out a first embodiment of the method.
Figure 1B:
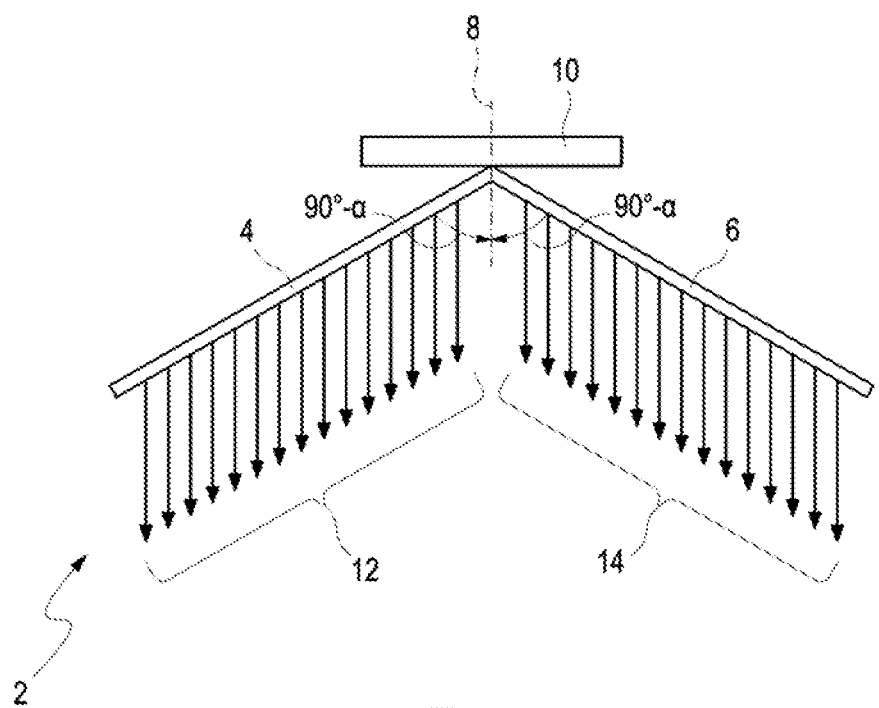

The first embodiment of the display device 2 is schematically illustrated in a first operating position in FIG. 1a and in a second operating position in FIG. 1b. This display device 2 has a first display panel 4 and a second display panel 6 in this case. A bending plane 8 is also defined in the display device 2 and, in the first operating position (FIG. 1a), is oriented perpendicular to the surfaces of both display panels 4, 6, wherein the surfaces of both display panels 4, 6, in the first operating position, are arranged parallel to one another and beside one another in a common plane which is likewise oriented perpendicular to the bending plane 8. In this case, these two display panels 4, 6 form a pair of display panels 4, 6 which are arranged symmetrically with respect to the bending plane 8 and can be pivoted in opposite directions relative to the bending plane 8, wherein a common axis, about which these display panels 4, 6 which are directly adjacent here can be pivoted, runs through the bending plane 8.

In this case, the display device 2 also has a holding device 10 having a first outer surface or outer side to which the two display panels 4, 6 are pivotably fastened. The holding device 10 also has a second outer surface or outer side, via which the holding device 10 and therefore also the entire display device 2 can be arranged on an inner wall of a vehicle, for example on a center console between two front seats of the vehicle.

In the first operating position, provision is made for display content 12 of the first display panel 4, which is arranged here to the left of the bending plane 8, to be emitted to the left at an angle α which here is pivoted to the left from the display plane 8 in the clockwise direction. Accordingly, the first display content 12 is emitted to the left at an angle of 90°-α relative to a surface of the first display panel 4. In contrast, second display content 14 of the second display panel 6 is likewise emitted at the angle α which, however, is pivoted here to the right from the bending plane 8 in the anti-clockwise direction. Accordingly, the second display content 14 is emitted to the right at an angle of 90°-α relative to a surface of the second display panel 6. Therefore, the first display content 12 is visible from a first perspective in the first operating position and the second display content 14 is visible from a second perspective in the first operating position, wherein directions of these two display contents 12, 14 are overall oriented at twice the angle α or at an angle 2α relative to one another.

In the second operating position provided on the basis of FIG. 1b, provision is made for the first display panel 4 arranged on the left to be pivoted to the right in the anti-clockwise direction toward the bending plane 8 at an angle of 90°-α, whereas the right-hand, second display panel 6 is pivoted to the left in the clockwise direction toward the bending plane 8 likewise at the angle of 90°-α.

However, provision is made for a respective angle 90°-α, at which display content 12, 14 of a respective display panel 4, 6 is emitted relative to a respective surface of the respective display panel 4, 6 with respect to the first operating position, to also be retained in the second operating position, thus resulting in the display contents 12, 14 of both display panels 4, 6 being emitted parallel to one another and also parallel to the bending plane 8 in the second operating position.

Figure 2:
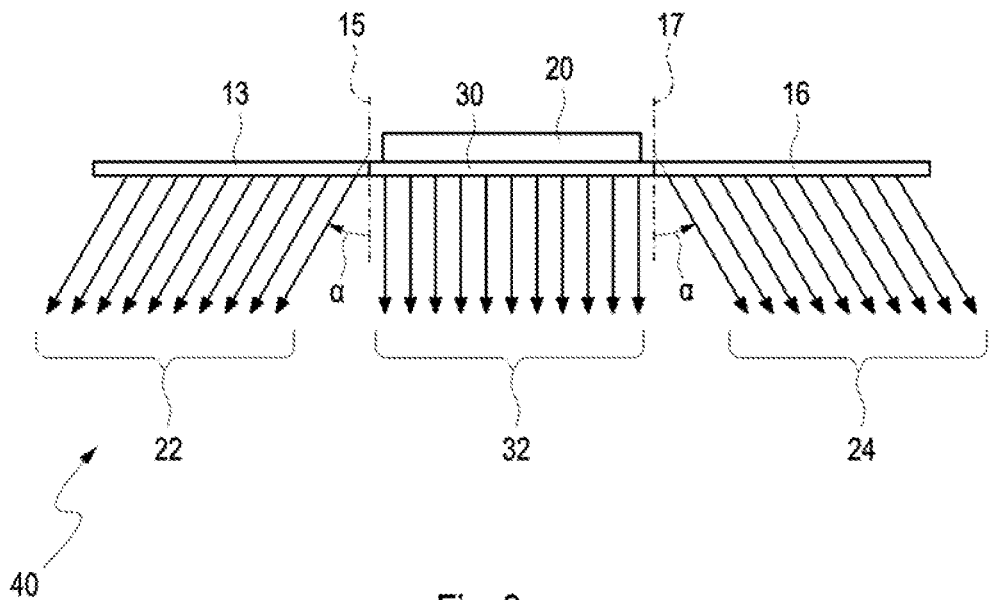
FIG. 2 is a schematic illustration of a second embodiment of the display device in different operating states which result when carrying out a second embodiment of the method.
Figure 2:
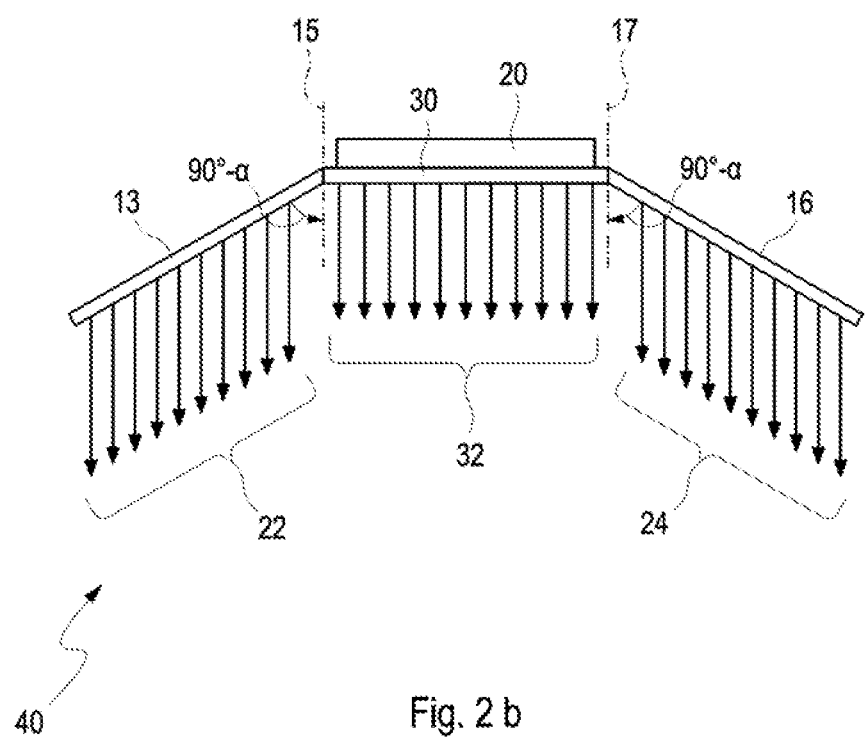

The second embodiment of the display device 40 is schematically illustrated in a first operating position in FIG. 2a and in a second operating position in FIG. 2b. This display device 40 here includes a first display panel 13, a second display panel 16 and a third, fixed display panel 30 which is arranged between the first and second display panels 13, 16. Furthermore, a first bending plane 15, which is assigned to the first display panel 13, and a second bending plane 17, which is assigned to the second display panel 16, are defined for the display device 40.

In this case, a first axis, about which the first display panel 13 can be pivoted relative to the directly adjacent third display panel 30, runs through the first bending plane 15. The second display panel 16 can be pivoted relative to the directly adjacent third display panel 30 about a second axis which runs through the second bending plane 17. The two bending planes 15, 17 which are parallel to one another are oriented perpendicular to the surfaces of all three display panels 13, 16, 30 in the first operating position (FIG. 2a), wherein the surfaces of the display panels 13, 16, 30, in the first operating position, are arranged parallel to one another and beside one another in a common plane which is likewise oriented perpendicular to the bending planes 15, 17 which are parallel to one another.

The display device 40 also here includes a holding device 20 having a first outer surface to which the third display panel 30 is fastened in a stationary manner and is therefore fixed. The holding device 20 also has a second outer surface, via which the holding device 20 and therefore also the entire display device 40 can be arranged on an inner wall of a vehicle, for example on a center console between two front seats of the vehicle. The first outer surface and the second outer surface of the holding device 20, which is parallel to the first outer surface, are oriented perpendicular to the two bending planes 15, 17. The first display panel 13 can be pivoted relative to the first bending plane 15 assigned to it, the third display panel 30 and the holding device 20 and therefore also the inner wall. In addition, the second display panel 16 can be pivoted relative to the second bending plane 17 assigned to it, the third display panel 30 and the holding device 20 and therefore also the inner wall.

In the first operating position, provision is made for display content 22 of the first display panel 13, which is arranged here to the left of the first bending plane 8 and the third display panel 30, to be emitted to the left at an angle α which is here pivoted to the left in the clockwise direction from the display plane 8. Accordingly, the first display content 22 is emitted to the left at an angle of 90°-α relative to a surface of the first display panel 13. In contrast, second display content 24 of the second display panel 16 is likewise emitted at the angle α which, however, is here pivoted to the right in the anti-clockwise direction from the second bending plane 8 and the third display panel 30. Accordingly, the second display content 24 is emitted to the right at an angle of 90°-α relative to a surface of the second display panel 16. Display content 32 of the third display panel 30 is emitted parallel to the bending planes 15, 17 and perpendicular to the surface thereof in the first operating position. The first display content 22 is therefore visible from a first perspective in the first operating position and the second display content 24 is visible from a second perspective in the first operating position, wherein directions of these two display contents 22, 24 are overall oriented at an angle with respect to one another which is twice as large as the angle α, that is to say at an angle 2α or 2*α.

In the second operating position provided on the basis of FIG. 2b, provision is made for the first display panel 13 which is arranged on the left to be pivoted to the right in the anti-clockwise direction toward the first bending plane 15 and the third display panel 30 at an angle of 90°-α, whereas the right-hand second display panel 16 is pivoted to the left in the clockwise direction toward the second bending plane 17 and the third display panel 30 likewise at the angle of 90°-α. In contrast, an orientation of the third display panel 30 and its display content 32 relative to the holding device 20 and therefore the inner wall is unchanged in the second operating position in comparison with the first operating position.

However, provision is made for a respective angle 90°-α, at which the display content 22, 24 of the first and second display panels 13, 16 is emitted relative to a respective surface of the respective display panel 13, 16 with respect to the first operating position, to also be retained in the second operating position, thus resulting in the display contents 22, 24, 32 of all three display panels 13, 16, 30 being emitted parallel to one another in the second operating position. In the second embodiment, the first and second display panels 13, 16 form a pair of display panels 13, 16 which are arranged symmetrically with respect to the fixed, third display panel 30 arranged between them and can be pivoted in opposite directions with respect thereto.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A display device arranged on an inner wall in an interior of a vehicle, comprising:
   a plurality of display panels, including first and second display panels directly adjacent and connected at a common axis and having first and second surfaces emitting first and second display content, respectively, the first display panel being pivotable about a first bending plane relative to the second display panel, the first display panel emitting the first display content from the first surface into the interior at a first angle α relative to the first bending plane when in a first operating position and, when the first display panel is pivoted at a second angle of 90°-α relative to the bending plane to a second operating position, the first display content into the interior parallel to the first bending plane.

2. The display device as claimed in claim 1, wherein the first bending plane is oriented at a predetermined angle with respect to an interior surface of the inner wall.

3. The display device as claimed in claim 2, wherein the first angle α is an acute angle greater than 0° and less than 90°.

4. The display device as claimed in claim 3,
   wherein the plurality of display panels include a third display panel, pivotable relative to a second bending plane, having a third surface emitting third display content, the first and third surfaces of the first and third display panels being oriented perpendicular to the first and second bending planes, respectively, in the first operating position to emit the first and third display content at the first angle α relative to the first and second bending planes, respectively, with the first and third display panels emitting the first and third display content in different directions at a third angle of 2α between the different directions, and
   wherein each of the first and third surfaces of the first and third display panels is at the second angle of 90°-α relative to the first and second bending planes in the second operating position, so that the first and third display panels emit the first and third display content in parallel.

5. The display device as claimed in claim 3,
   wherein the first bending plane is arranged between the first and second display panels and the second display panel is pivotable about the first bending plane,
   wherein the first and second display panels are each oriented perpendicular to the first bending plane in the first operating position to emit the first and second display content at the first angle α relative to the first bending plane with the first and second display content emitted in different directions away from the first bending plane at a third angle of 2α between the different directions, and
   wherein each of the first and second surfaces of the first and second display panels is at the second angle of 90°-α relative to the first bending plane in the second operating position, so that the first and second display panels emit the first and second display content in parallel.

6. The display device as claimed in claim 5, wherein the first angle α for each display panel is permanently set.

7. The display device as claimed in claim 3, wherein the second display panel is fixed in a stationary manner relative to the first bending plane with the second surface oriented perpendicular to the first bending plane and emitting the second display content parallel to the at least one bending plane.

8. The display device as claimed in claim 4, wherein the second display panel is arranged between the first and third display panels.

9. The display device as claimed in claim 8, further comprising at least one holding device having two outer surfaces arranged parallel to one another, a first of the two outer surfaces connected to at least one of the first, second and third display panels and a second of the two outer surfaces attachable to the inner wall.

10. The display device as claimed in claim 9,
    wherein the display device is arranged between two seats of the vehicle on the inner wall at a front of the vehicle in a forward direction of travel of the vehicle, and
    wherein at least one of the first, second and third display panels emits respective display content towards at least one of the two seats when in the first operating position.

11. The display device as claimed in claim 1,
    wherein the plurality of display panels include a third display panel pivotable relative to a second bending plane, having a third surface emitting third display content, the first and third surfaces of the first and third display panels being oriented perpendicular to the first and second bending planes, respectively, in the first operating position to emit the first and third display content at the first angle α relative to the first and second bending planes, respectively, with the first and third display panels emitting the first and third display content in different directions at a third angle of 2α between the different directions, and wherein each of the first and third surfaces of the first and third display panels is at the second angle of 90°-α relative to the first and second bending planes in the second operating position, so that the first and third display panels emit the first and third display content in parallel.

12. The display device as claimed in claim 1,
wherein the first bending plane is arranged between the first and second display panels,
wherein the first and second display panels are each oriented perpendicular to the first bending plane in the first operating position to emit the first and second display content at the first angle α relative to the first bending plane with the first and second display content emitted in different directions away from the first bending plane at a third angle of 2α between the different directions, and
wherein each of the first and second surfaces of the first and second display panels is at the second angle of 90°-α relative to the first bending plane in the second operating position, so that the first and second display panels emit the first and second display content in parallel.

13. The display device as claimed in claim 11, wherein the second display panel is fixed relative to the at least one bending plane and arranged between the first and third display panels.

14. A method for presenting display content by a display device arranged on an inner wall in an interior of a vehicle and subdivided into a plurality of display panels, comprising:
respectively emitting first and second display content from first and second surfaces of first and second display panels directly adjacent and connected at a common axis, the first display panel being pivotable about a first bending plane relative to the second display panel, the first display content emitted into the interior at a first angle α relative to the first bending plane when the first surface of the first display panel is oriented perpendicular to the first bending plane in a first operating position;
pivoting the first display panel relative to the first bending plane to a second angle of 90°-α in a second operating position; and
emitting the first display content, from the first display panel, parallel to the first bending plane in the second operating position.

15. The method as claimed in claim 14, further comprising:
pivoting a third display panel relative to a second bending plane, from the first operating position with the first and third display panels oriented perpendicular to the first and second bending planes, respectively, to the second operating position with the first and third display panels at the second angle of 90°-α relative to the first and second bending planes, respectively;
emitting third display content in the first operating position from a third surface of the third display panel at the first angle α relative to the second bending plane, so that the first and third display content is emitted in different directions at a third angle of 2α between the different directions; and
emitting the third display content in the second operating position from the third surface of the third display panel parallel to the second bending plane.

16. The method as claimed in claim 14,
wherein said emitting of the second display content from the second surface of the second display panel in the first operating position is at the first angle α relative to the first bending plane, so that the first and second display content is emitted in different directions away from the first bending plane, with the common axis lying in the first bending plane between the first and second display panels, and
wherein said method further comprises:
pivoting the second display panel about the first bending plane from the first operating position with the first and second display panels oriented perpendicular to the first bending plane, to the second operating position with the first and second display panels at the second angle of 90°-α relative to the first bending plane; and
emitting the second display content, from the second surface of the second display panel in the second operating position, parallel to the first bending plane.

17. The method as claimed in claim 15,
wherein said emitting of the second display content in the first operating position is parallel to the first and second bending planes from the second display panel having the second surface permanently oriented perpendicular to the first and second bending planes, and
wherein said method further comprises emitting the second display content parallel to the first and second bending planes when the second display panel is in the second operating position.

18. The method as claimed in claim 15, wherein the second display panel is arranged between the first and third display panels.

19. The method as claimed in claim 15, wherein the display device is arranged between two seats of the vehicle on the inner wall at a front of the vehicle in a forward direction of travel of the vehicle, and
wherein said emitting of the first, second and third display content in the first operating position includes emitting respective display content towards at least one of the two seats.

20. The method as claimed in claim 14,
wherein said emitting of the second display content in the first operating position is parallel to the first and second bending planes from the second display panel having the second surface permanently oriented perpendicular to the first and second bending planes, and
wherein said method further comprises emitting the second display content parallel to the first and second bending planes when the second display panel is in the second operating position.

* * * * *